Patented Sept. 8, 1925.

1,552,797

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing. Application filed February 23, 1923. Serial No. 620,608.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While cellulose ethers form thin solutions in acetone and benzol separately, it has been found that such single solvents by themselves do not have sufficient power to dissolve the proportion of ethers which is desirable when compounding the thick flowable compositions or dopes, such as are used in the manufacture of photographic film base by customary methods, or such as are used in other plastic arts.

I have discovered that an adequately strong and useful solvent may be prepared by mixing acetone and benzol. The proportions in which they are used may vary over a very wide range without destroying the extra solvent power obtained by mixing them. In the preferred embodiment of my invention I mix 3 parts of acetone with 11 parts of benzol. In 5 to 7 parts of this mixture I dissolve 1 part of cellulose ether, say water-insoluble ethyl cellulose for instance. The single solvents by themselves will not make desirably flowable solutions of this strength. Of course, the amount of volatile mixture of benzol and acetone may be increased relative to the amount of ether when preparing varnishes and the like, as will be understood by those skilled in the art.

Other substances which impart additional suppleness, or incombustibility, or other qualities, to the film may also be added to the dope, such, for instance, as triphenyl or tricresyl phosphate, monochlornaphthalene, camphor, etc. The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A composition of matter comprising cellulose ether, benzol and acetone, the ingredients being homogeneously mixed in unprecipitated form.

2. A viscous flowable film-forming composition comprising cellulose ether dissolved in a mixture of benzol and acetone, the weight of benzol being approximately four times the weight of the acetone.

3. A composition of matter comprising 1 part of cellulose ether dissolved in not exceeding 8 parts of a mixture of benzol and acetone.

4. A composition of matter comprising approximately 2 parts of water-insoluble ethyl cellulose, 11 parts of benzol and 3 parts of acetone.

Signed at Rochester, New York this 14th day of February 1923.

JOHN M. DONOHUE.